United States Patent [19]

Kijowski et al.

[11] Patent Number: 4,571,321
[45] Date of Patent: Feb. 18, 1986

[54] METHOD AND APPARATUS FOR LEVELING A BATCH OF PULVERULENT CONSTITUENTS IN MAKING A VITREOUS CELLULAR MATERIAL

[75] Inventors: John Kijowski, Bradford; Gregory D. Miller, Port Allegany, both of Pa.

[73] Assignee: Pittsburgh Corning Corporation, Pittsburgh, Pa.

[21] Appl. No.: 566,520

[22] Filed: Dec. 29, 1983

[51] Int. Cl.⁴ .................... B28B 1/08; C04B 38/00
[52] U.S. Cl. .................... 264/43; 264/69; 264/70; 404/115; 425/429; 425/456
[58] Field of Search ............... 264/69, 43, 70; 425/456, 426, 427, 429; 404/113, 115, 97, 114, 118, 120

[56] References Cited

U.S. PATENT DOCUMENTS

| | | | |
|---|---|---|---|
| 1,815,959 | 7/1931 | Wildermon | 264/69 |
| 2,093,586 | 9/1937 | Day | 425/456 |
| 2,160,462 | 5/1939 | Schieferstein | 404/113 |
| 2,192,183 | 3/1940 | Deutsch | 264/69 |
| 2,235,001 | 3/1941 | Allen | 264/69 |
| 2,292,733 | 8/1942 | Baily | 425/456 X |
| 2,296,453 | 9/1942 | Soffert | 264/69 |
| 2,507,302 | 5/1950 | Giertz-Hedström | 264/69 |
| 2,633,782 | 4/1953 | Clement | 404/114 X |
| 2,643,595 | 6/1953 | Jackson | 404/113 |
| 2,909,826 | 10/1959 | McElroy | 425/456 X |
| 3,042,594 | 7/1962 | Hauth | 264/69 |
| 3,046,856 | 7/1962 | Baxter | 404/118 |
| 3,498,384 | 3/1970 | Ogura | 404/113 X |

FOREIGN PATENT DOCUMENTS

| | | | |
|---|---|---|---|
| 2313752 | 10/1974 | Fed. Rep. of Germany | 425/456 |
| 41949 | 1/1933 | France | 404/113 |
| 783191 | 4/1935 | France | 404/113 |
| 1261478 | 1/1972 | United Kingdom | 425/456 |
| 302238 | 6/1971 | U.S.S.R. | 264/69 |

Primary Examiner—Philip Anderson
Attorney, Agent, or Firm—Stanley J. Price, Jr.

[57] ABSTRACT

A method and apparatus for leveling a batch of pulverulent constituents in making a vitreous cellular material. A screen structure having at least one substantially flat screen layer is impressed down into and through at least a portion of the batch of pulverulent constituents. The screen structure is vibrated horizontally in a circular orbital motion while impressing the screen structure down into and through at least a portion of the batch of pulverulent constituents.

10 Claims, 6 Drawing Figures

METHOD AND APPARATUS FOR LEVELING A BATCH OF PULVERULENT CONSTITUENTS IN MAKING A VITREOUS CELLULAR MATERIAL

BACKGROUND OF THE INVENTION

1. Field of the Invention

The present invention relates to the manufacture of a cellular vitreous material and, more particularly, relates to a method and apparatus for leveling a batch of pulverulent constituents in making a vitreous cellular material.

2. Description of the Prior Art

Cellular vitreous materials are well known for there use as heat insulators and for other similar applications. An example of a cellular vitreous material is cellular glass formed by heating a pulverulent glass batch which includes a cellulating agent, such as carbon black or the like, to a temperature permitting sintering and cellulation of the batch as described in U.S. Pat. No. 2,736,142. Additionally, examples of vitreous cellulatable siliceous materials formed from a pulverulent constituent batch are also disclosed in U.S. Pat. No. 2,736,142.

In one method of making a vitreous cellular material, the batch of pulverulent constituents, such as a cellulatable glass batch, is placed in a mold as, for example, a generally rectangular mold, and heated to preselected sintering and cellulating temperatures. Gases are generated in the heated mass and are entrapped in the mass in bubble form to give the mass a cellular structure. A block of vitreous cellular material, such as cellular glass, is removed from the mold and annealed.

The sintering temperature is the temperature at which the particles of the pulverulent batch become soft and adhere together. The cellulation of the batch of pulverulent constituents, such as a pulverulent glass batch, generally results at a temperature around or slightly above the sintering temperature. In the preparation of a vitreous cellular material from a pulverulent batch of constituents, a major concern is the uneven sintering and cellulating of the pulverulent constituent batch leading to the formation of a nonuniformly cellulated material. The nonuniform cellulation can be present in the form of voids, folds, or the like. Further, a top surface geometry that is not substantially uniform would promote decreased selection rates. Maintaining a uniformity of cell geometry in the formed vitreous cellular material promotes maximum insulating efficiency, if the vitreous cellular material is used in insulating applications. Further, the higher the degree of uniformity present in the batch of pulverulent constituents prior to sintering and cellulating of the batch, the more likely it is that the pulverulent constituent batch will reach cellulating temperature faster and in a more uniform manner; and the more likely it is that uniform cell geometry will be promoted in the formed vitreous cellular material. Promoting uniformity within the pulverulent constituent batch can promote increased production and selection rates for the resultant vitreous cellular material.

U.S. Pat. No. 2,736,142 to Baumler et al. discloses a process for manufacturing cellulated material. Baumler relates to the manufacture of cellular vitreous products, such as cellular glass and cellular silica, from pulverulent batch material. In Baumler, the pulverulent batch is initially formed into a number of small segments. The batch is segmented by scoring, dicing, separating, or other suitable methods which impart a segmented appearance to the batch. The segmentation of the batch can be uniform so as to produce a uniform cellulation or can be in a pattern resulting in a pattern of cellulation. The segmented batch is then heated to a temperature sufficient for the segments to sinter, cellulate, and expand through entrapment of gases generated therein to form a unitary structure.

Baumler et al. states that benefits achieved by segmenting the batch are relatively uniform and rapid heat penetration of the batch and a substantial uniformity of cell size within each piece, or segment, in relation to each other piece or segment.

U.S. Pat. No. 4,225,545 to Munk et al. discloses a method and apparatus for making preforms from a pourable substance for use in producing three-dimensional profiled articles. In Munk et al., a pourable substance is introduced into a container having a perforated bottom. The perforated bottom together with a mold defines a forming space to be filled with the pourable substance. The pourable substance proceeds through the perforations of the container bottom and is distributed throughout the forming space, resulting from vibration of the perforated container bottom. The pourable substance is compacted within the forming space due to the vibration of the perforated bottom. The preform can be taken out of the mold and compressed elsewhere into the profiled article, or the article can be produced from the preform directly in the mold. The bottom may also include two juxtaposed bottom members each having a different perforation spacing and each having an independent vibratory movement relative to each other.

Munk et al. states that the method disclosed therein is advantageous for producing preforms for articles of uniform wall thickness, even if the articles have a strongly profiled configuration and steep wall portions. If this is the case, Munk et al. states that vibratory movement to the perforated container bottom is substantially along a horizontal plane to compact the pourable substance in the forming space.

U.S. Pat. No. 3,965,527 to Zwart discloses a method and apparatus for filling spacing core materials, such as honeycomb. In Zwart's method, a compressible fibrous material is placed on a flat base and a sheet of rigid open cell core stock is placed on the fibrous material. A weight is placed over the open cell core stock. The base is vibrated until the lower edges of the core stock cut through the layer of fibrous material. The resulting cut portions of the fibrous material expand into the open cells of the core stock. The core stock is subjected to a partial vacuum from the top thereof to allow the cells of the core to uniformily fill with the cut fibrous material. A fine mesh screen desirably is placed over the core to prevent the compressible fibrous material from being drawn into the vacuum producing apparatus.

U.S. Pat. No. 3,697,208 to Munk et al. discloses an apparatus for filling molds. In Munk et al., non-flowing molding materials are blown into the mold cavity which has a screen defining one surface of the article to be molded. As the non-flowing molding materials fill up the cavity, the carrying air vents through the screen. When the mold cavity fills up to the feeding nozzle, a vent flap in the nozzle opens allowing the air carrying the non-flowing materials to vent through a screened opening exposed by the flap.

U.S. Pat. No. 3,171,872 to Jarrett et al. discloses a method and apparatus for producing particle board and the like. Jarrett discloses use of a vibratory conveyor unit having an open trough mounted on springs inclined at an angle from the vertical and extending upwardly from a base fixed to a traveling frame. The trough is provided with a wire mesh screen deck sized to allow separation of the fine and coarse particles. The particles are deposited on the vibratory conveyor unit from a belt scale. The finer particles pass through the wire screen deck and rest on the bottom of the trough, while the coarser particles are supported on the wire mesh screen deck. This patent notes that the wire mesh screen deck is removably supported in the trough to allow decks of different mesh sizes to be used. Additionally, Jarrett states that one or more screen decks can be used in the trough to provide the desired particle separation.

U.S. Pat. No. 2,689,597 to Kinnear discloses an apparatus and process for forming mats of comminuted material. In this patent, a reticulated member is interposed between a source of supply of the comminuted material and a receiving surface, the reticulated member having a mesh of a gauge adapted to pass the material. A relative transverse movement is imparted between the source of material and the receiving surface and the reticulated member is simultaneously vibrated to distribute the material on the receiving surface to uniform density. The reticulated member can be vibrated at high frequency and with a small amplitude of vibration.

U.S. Pat. No. 3,168,603 to Seefluth discloses a method and apparatus for preparing sheets of thermoresponsive plastic particulate material. In Seefluth's method for forming a sheet of thermoresponsive plastic particulate material, a plurality of substantially monogranular layers of the material are laid down in successive layers. After laying down each layer, a heat source is past over the just-laid-down layer causing the plastic particles to fuse and solidify with each other and with the earlier laid particles. Desirably, the plastic particulate material is subjected to vibration to promote uniform leveling of the material prior to heating.

U.S. Pat. No. 3,660,547 to Ruekberg discloses an electrostatic molding process. In Ruekberg's method for producing containers, a charged comminuted material is introduced into a channel having a similar electrical charge. The channel is positioned within a mold having a potential of opposite electrical charge. The material is agitated in the channel to assist in the electrostatic distribution of the comminuted material in the mold. The temperature of the mold is controlled to permit fusing of the deposited material in the form of a container. This patent mentions that a screen may be placed over the open portion of the channel to provide uniform distribution of the comminuted material. Ruekberg further mentions that the comminuted material can be plastic, glass or metal which is induced to deposit on the mold surface under the influence of electrical means.

U.S. Pat. No. 3,746,589 to Reinke discloses a method of making bubble-free, fiber reinforced plastic laminates by tamping operations. In Reinke, a layer of fibrous material is tamped into a layer of liquid plastic material. The tamping is performed by directing blows on the layers in adjacent areas arranged like a grid, while the layers are moved relative to the areas. This patent mentions that the surface of the impulse transmitters, which exert the blows or tamping, may be perforated.

What is needed in the making of a vitreous cellular material from a batch of pulverulent constituents is a method and apparatus for leveling the batch of constituents which promotes substantially uniform compaction of and distribution within the pulverulent constituent batch allowing a faster sintering rate and substantially uniform cell geometry.

What is further needed is a method and apparatus for leveling a batch of pulverulent constituents in making a vitreous cellular material which generally eliminates the need for vibration of a mold pan into which a pulverulent batch of constituents is placed.

SUMMARY OF THE INVENTION

In accordance with the present invention, there is provided a method for leveling a batch of pulverulent constituents in a process for making a vitreous cellular material, such as cellular glass. The method includes impressing a screen structure having at least one substantially flat screen layer down into and through at least a portion of the batch of pulverulent constituents. The screen structure is vibrated horizontally in a circular orbital motion while the screen structure is impressed down into and through at least a portion of the batch of pulverulent constituents to level the batch.

The present invention also provides an apparatus for leveling a batch of pulverulent constituents in making a vitreous cellular material, such as cellular glass, that includes a support member, a screen structure mounted to the support member having at least one substantially flat screen layer, impressing means in communication with the support member for impressing the screen structure down into and through at least a portion of the batch of pulverulent constituents, and vibrating means in engagement with the support member for vibrating the screen structure horizontally in a circular orbital motion. The vibrating means is operative concurrently with the impressing means.

Preferably, the screen structure has a plurality of substantially flat screen layers substantially uniformally spaced from each other; and more preferably, the screen structure has two substantially flat screen layers substantially uniformly spaced from each other.

An object of the invention is to provide for leveling a batch of pulverulent constituents in the making of a vitreous cellular material, such as cellular glass, which promotes substantially uniform compaction of and distribution of the constituents within the pulverulent constituent batch.

An additional object of the invention is to promote air removal from the pulverulent constituent batch in making a vitreous cellular material.

A further object of the invention is to promote a faster sintering rate of the batch of pulverulent constituents in making a vitreous cellular material.

Another object of the present invention is to provide a method and apparatus for leveling a batch of pulverulent constituents in the making of a vitreous cellular material, such as cellular glass, which promotes substantially uniform cell geometry within the formed vitreous cellular material and substantial uniformity of top surface geometry.

A further object of the present invention is to provide a method and apparatus for leveling a batch of pulverulent contituents in the making of a vitreous cellular material which generally eliminates the need for vibration of a mold pan into which a batch of pulverulent constituents is placed.

These and other objects of the present invention will be more completely disclosed and described in the following specification, the accompanying drawings, and the appended claims.

DESCRIPTION OF THE PREFERRED EMBODIMENTS

Figure 1:
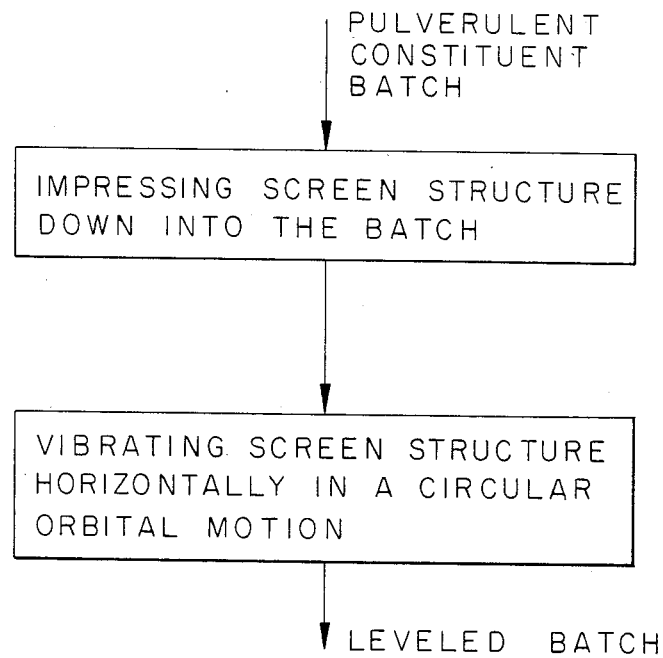
FIG. 1 is a flow diagram illustrating the method of the present invention.

Referring to the drawings, FIG. 1 shows a flow diagram of the present invention as will be discussed hereinafter. Referring to FIGS. 2 thru 6, an embodiment of an apparatus according to the present invention, generally designated by the numeral 10, is illustrated therein.

Apparatus 10 has a support member 12. Support member 12 includes a motor mounting plate 14 and a screen mounting plate 16. In the embodiment shown in FIGS. 2 and 6, plate 14 is generally hexagonal in configuration and plate 16 is generally rectangular in configuration. Other suitable configurations are possible for these plates in other embodiments, such as a circular or octogonal configuration. Support member 12 further includes a plurality of spacers 18 between the lower surface of motor mounting plate 14 and the upper surface of screen mounting plate 16. Each of spacers 18 has a bore 20 centrally located therethrough. The embodiment shown in FIG. 2 has six such spacers 18, two of which are not shown in the view of FIG. 2. Support member 12 further includes a plurality of spacers 22 positioned on the upper surface of motor mounting plate 14 in alignment with spacers 18. Spacers 22 have a bore 24 extending centrally therethrough. The embodiment of FIG. 2 has six spacers 22, two of which are not shown in the view of FIG. 2. Spacers 18 and 22 are spaced about the periphery of the respective plates 14 and 16 in a balanced relation as indicated in FIG. 2.

Motor mounting plate 14 has a plurality of bores 26 and screen mounting plate 16 as a plurality of bores 28 where each of spacers 18 and 22 are located. Bores 26 and 28 are in alignment with bores 20 and 24 such that a channel is formed therethrough. A suitable fastening device, such as a threaded bolt 30 and a nut 32 is used to secure plates 14 and 16 and each of spacers 18 and 22 in a fixed, spaced relation. A bolt 30 is passed through each channel formed by bores 20, 24, 26, and 28 and secured at the end thereof by a nut 32. Desirably, a washer 36 may be placed between the lower surface of plate 16 and nut 32.

Plates 14 and 16 and spacers 18 and 22 are made of any suitable material compatible with the use and application for the apparatus, such as aluminum.

Figure 2:
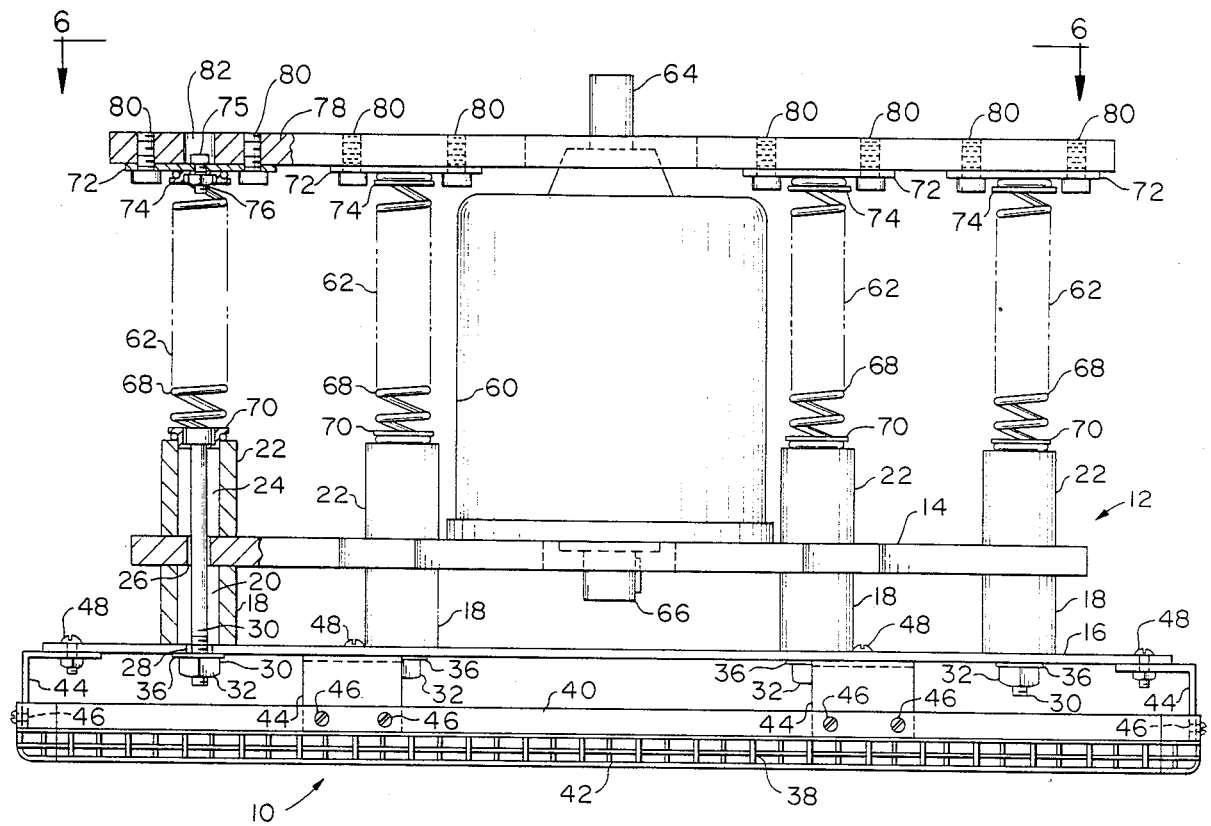
FIG. 2 is a front elevational view showing an embodiment of the apparatus of the present invention.

The support member 12 shown in FIG. 2 is an example of a typical support member for use in the present invention. Other arrangements and constructions for the support member 12 are possible. For example, the plates and spacers could be welded to each other to form a unitary structure. Spacers 18 and 22 of FIG. 2 desirably have a generally cylindrical shape, although spacers 18 and 22 can be of any suitable shape in other embodiments of the invention. Further, if spacers are present in the embodiment, the number of spacers can also vary, depending upon the embodiment of the apparatus and its use.

Screen structure 38 has a base portion 40 and a screen portion 42. Base portion 40 is mounted to screen mounting plate 16 by brackets 44. Brackets 44 are preferably angle brackets as shown in FIG. 2; six brackets 44 are used in the apparatus of FIG. 2 as seen from FIG. 6, although only 4 of brackets 44 are shown in FIG. 2. The number of brackets 44 used in other embodiments can vary, as well as other suitable joining devices can be employed. Brackets 44 are desirably spaced about the periphery of plate 16 and screen structure 38 in a balanced relationship.

Figure 6:
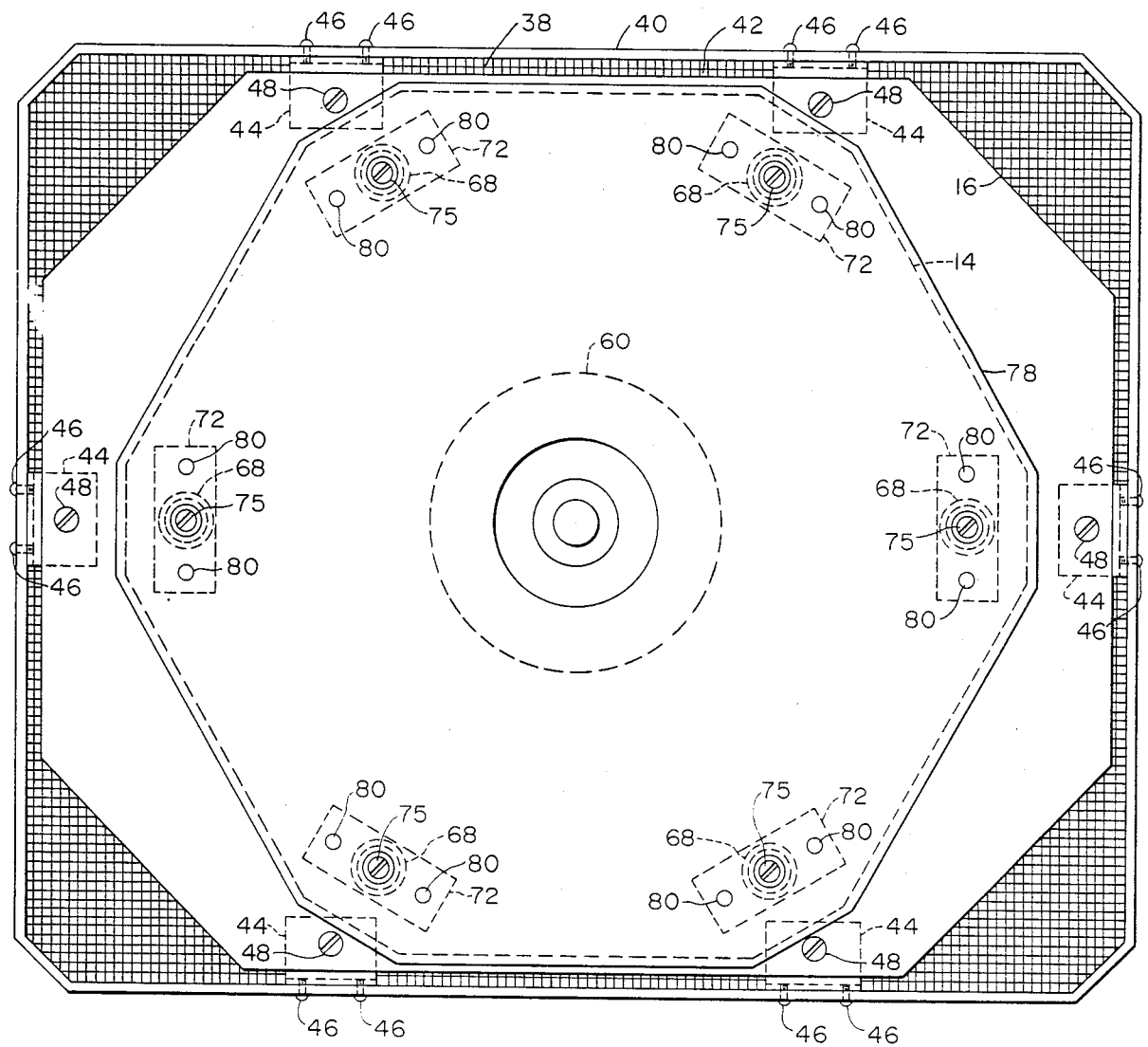
FIG. 6 is a top view taken along Line 6—6 of FIG. 2.

Brackets 44 are secured to base portion 40 of screen structure 38 by any suitable fasteners, such as by metal screws. In FIGS. 2 and 6, each of brackets 44 is secured to base portion 40 by a pair of metal screws 46 passing through suitably sized openings in base portion 40 and each of brackets 44. Likewise, each of brackets 44 is apporpriately secured to mounting plate 16 by a suitable fastening device such as a nut and bolt. A nut and bolt arrangement 48 is used for securing each of brackets 44 to screen mounting plate 16. Appropriately sized openings are provided in plate 16 and in each of brackets 44 for securing each of brackets 44 to plate 16 with a nut and bolt arrangement 48. Brackets 44 desirably maintain screen structure 38 in spaced relation with plate 16 as shown in FIG. 2 to provide an adequate clearance between structure 38 and plate 16 when screen structure 38 is impressed down into and through at least a portion of the batch of pulverulent constituents in leveling the batch.

Figure 3:
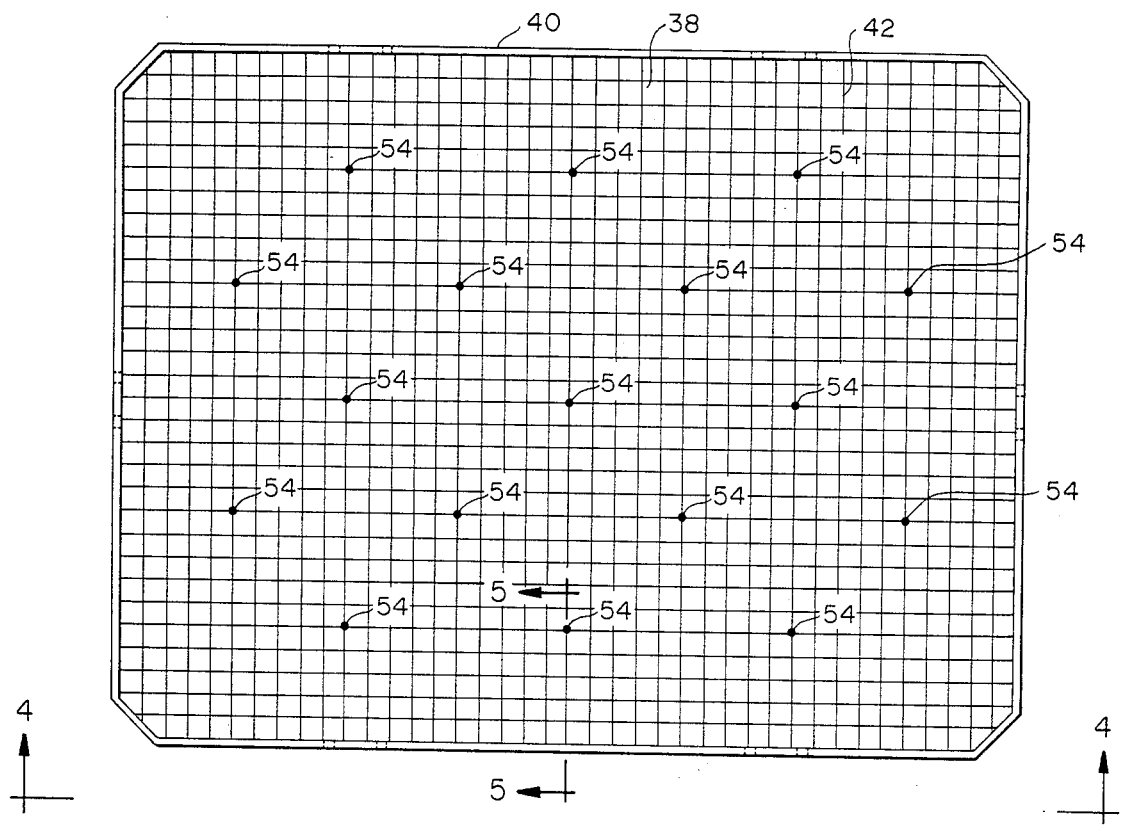
FIG. 3 is a top view of the screen structure of FIG. 2.
Figure 4:
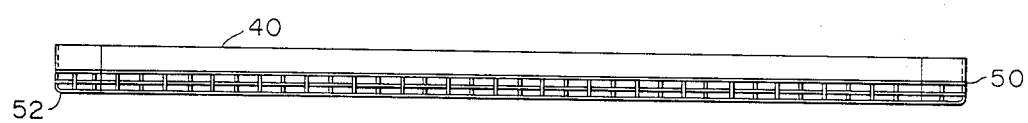
FIG. 4 is a front elevational view of the screen structure taken along line 4—4 of FIG. 3.
Figure 5:
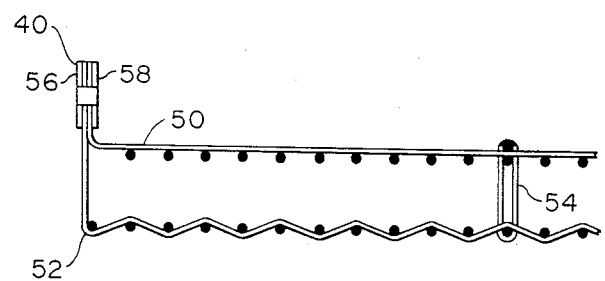
FIG. 5 is an elevational section taken along Line 5—5 of FIG. 3.

FIG. 3 shows a top view of screen structure 38 of FIG. 2. FIG. 3 shows base portion 40 and screen portion 42. Screen portion 42 in the embodiment illustrated in the drawings has two substantially flat screen layers 50 and 52 as shown in FIGS. 4 and 5. In other embodiments of the present invention, screen structure 38 can have a single substantially flat screen layer or a plurality of substantially flat screen layers being desirably substantially uniformly spaced from each other.

The number of screen layers and the shape of the screen structure is largely dependent upon the particular use and application of the apparatus of the present invention. The generally rectangular shape of screen structure 38 as shown in FIG. 3 is particularly useful in leveling a batch of pulverulent constituents in a typical rectangular mold pan as used in making cellular glass. Further, while the spacing of each of the substantially flat screen layers is largely dependent upon the particular application, it is desirable when a plurality of screen layers are used, such as the dual screen layer construction of FIGS. 3 thru 5, that the screen layers be spaced about ¼ inch to about ½ inch from each other. This spacing and a screen structure having two screen layers is generally preferred in the leveling of a batch of pulverulent constituents in making a vitreous cellular material, such as cellular glass.

Referring to FIG. 5, screen layers 50 and 52 are wire mesh screens. Wire mesh screening is generally desirable for most applications in leveling a batch of pulverulent constituents in making a vitreous cellular material, such as cellular glass. In FIG. 5, screen layer 50 is a welded mesh screen and screen layer 52 is a woven mesh screen. Screen layers 50 and 52 are preferably wire screens and are fabricated from a suitable material, such as stainless steel. In leveling a batch of pulverulent constituents, such as a cellular glass batch, it is desirable in a dual screen layer arrangement, as shown in FIGS. 3 to 5, that the lower layer 52 be a woven mesh wire screen and the upper layer 50 be a welded mesh wire screen.

It is preferable that the screen layer or layers have a generally symmetric screen pattern within the layer, such as a symmetric square mesh screen pattern, and be of a fine mesh so as to substantially prevent a hang-up of the batch of pulverulent constituents during leveling. In leveling a batch of pulverulent constituents in making a vitreous cellular material, such as cellular glass, it is desirable that the mesh of the screen layer or layers be not less than about 3/16 inch mesh to about 5/16 inch mesh. The number of screen layers and the construction of each layer, i.e. mesh size, woven or welded mesh, or perforated sheet metal, etc., is largely dependent upon the particular application involved. However, a screen structure having two layers is generally preferred for most applications.

It is further desirable that the screen layer or layers be either 4×4 mesh/inch or 3×3 mesh/inch wire screen. In leveling a batch of pulverulent constituents in making a vitreous cellular material, such as cellular glass, it is preferable that screen structure 38 have two screen layers, one of which is a 4×4 mesh/inch wire screen layer and the other of which is a 3×3 mesh/inch wire screen layer. It is further desirable that the 4×4 mesh/inch wire screen layer be a woven mesh screen and be the lower layer, such as layer 52 in FIG. 5; and the other layer be the 3×3 mesh/inch welded mesh screen layer and be the upper of the two screen layers, such as screen layer 50 in FIG. 5. In some applications, use of two screen layers each being 4×4 mesh/inch wire screen layers is also desirable.

The wire in the wire mesh screen layer or layers should be sufficiently fine yet be of adequate strength for use in leveling a batch of pulverulent constituents in making a vitreous cellular material. The particular dimensions of the screen wire can vary depending upon the particular use and application of the present invention. In leveling a batch of pulverulent constituents in making cellular glass, for example, it is desirable that the wire diameter in the wire mesh screen layer or layers be from about 0.045 inch to about 0.060 inch. Additionally, it is desirable that the openings in the wire mesh screen be from about 0.203 square inches to about 0.286 square inches to promote adequate leveling of the batch. However, the area of each opening in the wire mesh screen is dependent upon the particular use and application.

The screen layer should be fabricated of a material of sufficient strength, stiffness, rigidity and durability and be compatible with the batch of pulverulent constituents to the leveled. An example of a suitable material is stainless steel for the screen layer or layers. It is also desirable, in some applications of the present invention, that the substantially flat screen layer or layers be formed of a substantially uniformly perforated thin expanded metal having a generally symmetric perforation pattern, such as a symmetric square or hexagonal perforation pattern. It is preferable that such thin expanded metal screen layer be fabricated from stainless steel.

Referring to FIG. 5, it is desirable that a plurality of support spacers 54 be placed between layers 50 and 52 to assist in maintaining layers 50 and 52 in a uniformly spaced relation to each other. Each of spacers 54 is desirably joined to screen layers 50 and 52 by conventional methods, such as by brazing each of spacers 54 to each of layers 50 and 52. Spacers 54 are generally formed of wire and, more preferably, formed from stainless steel wire. Spacers 54 are desirably generally "U-Shaped" as shown in FIG. 5. The wire for spacers 54 should be of sufficient strength and be suited for the particular batch leveling application. An example of a suitable wire diameter for support spacers 54 is from about 0.045 inch to about 0.060 inch. Spacers 54 should be desirably distributed in a balanced manner over screen portion 42 of screen structure 38, such as indicated in FIG. 3, for example. The shape and the location of spacers 54 can very depending upon the over-all dimensions and configuration of screen structure 38, as well as the particular application involved.

Referring to FIG. 5, base portion 40 of screen structure 38 is fabricated of two metal strips 56 and 58 of a suitable material and of a sufficient thickness to define a channel therebetween in which channel the ends of screen layers 50 and 52 are positioned. Strips 56 and 58 and the ends of screen layers 50 and 52 in the aforementioned channel are joined together in a suitable conventional manner, such as by brazing. It is desirable that strips 56 and 58 be fabricated from sheet metal, such as stainless steel; and is desirable that the thickness of the sheet metal be from about 16 gauge to about 20 gauge. Base portion 40 of screen structure 38 can be formed in any other suitable conventional manner, such as a formed and shaped solid bar arrangement having screen layers 50 and 52 appropriately joined thereto in a suitable manner, such as by welding or the like.

Referring to FIG. 2, a motor 60 and a plurality of spring assemblies 62 are shown in engagement with support member 12 to provide for vibrating the screen structure 38 horizontally in a circular orbital motion. Motor 60 is preferably a variable speed electric motor. Motor 60 is desirably mounted to support member 12 in any conventional manner, such as by being bolted to motor mounting plate 14.

A suitable motor 60 for use with the present invention is commonly referred to as a commercial counterrotating separator drive. An example of a suitable counterrotating separator drive is Sweco Model S18B00702. Motor 60 is also desirably provided with a top motor weight assembly 64 and a bottom motor weight assembly 66 to which appropriate weights (not shown) are desirably positioned thereon to aid in providing the proper vibration. Bottom motor weight assembly 66 extends below and through motor mounting plate 14 through an opening appropriately provided in plate 14.

A spring assembly 62 is in engagement with each of spacers 22 of support member 12. The apparatus of the present invention shown in FIGS. 2 and 6 has six spring assemblies 62 engaging the six spacers 22, although two spring assemblies 62 and two spacers 22 are not visible in the view of the embodiment shown in FIG. 2. These six spring assemblies 62 are positioned in a spaced, balanced relation to each other about the peripheral area of plate 14 in engagement with spacers 22. The number of spring assemblies 62 needed can vary, depending upon the particular embodiment and its use. Regardless of the number of spring assemblies used, it is desirable that the spring assemblies be maintained in a spaced, balanced relation to each other.

Each spring assembly 62 of FIG. 2 includes a resilient member or spring 68. Each spring 68 is maintained at one end in engaging relation with a spacer 22 by a spring retainer 70. Each spring retainer 70 of each assembly 62 is engaged to a spacer 22 by a threaded bolt 30 and a nut 32, bolt 30 passing through a suitably sized opening in spring retainer 70. The arrangement of bolt 30 and nut 32 is as previously discussed herein. Each spring 68 is also maintained at the other end in engaging relation with a retaining plate 72 by a spring retainer 74. Each spring retainer 74 of each assembly 62 is secured against a retaining plate 72 by a bolt 75 and a nut 76. Bolt 75 is secured against retaining plate 72 and passes through a suitably sized opening in retaining plate 72 and a suitably sized opening in spring retainer 74 having a nut 76 on its end. Each retaining plate 72 is secured to frame plate member 78 by a pair of threaded bolts 80. A plurality of channels 82 are provided in frame plate member 78 permitting bolts 75 to be positioned therein when each retaining plate 72 is secured to member 78. Frame plate member 78 has a generally hexagonal configuration in the embodiment of FIG. 2 as seen in FIG. 6; and member 78 can be of any suitable shape, such as circular or octagonal, in other embodiments, depending on the use and application involved.

Frame plate member 78 provides suspended support through spring assemblies 62 for support member 12, member 12 having motor 60 and screen structure 38 in engagement therewith. The motor and spring assemblies arrangement should be suitably balanced and suspended so as to suppress vertical vibration and adjusted to the desired amplitude to provide for the vibration of screen structure 38 horizontally in a circular orbital motion when motor 60 is activated.

In the vibration of screen structure 38 horizontally in a circular orbital motion, the vibration amplitude or diameter should preferably be at least about equal to the mesh size dimensions of the screen layer or layers in screen portion 42, or should be at least about equal to the size dimensions of the perforations if a uniformly perforated thin expanded metal is used for any screen layer or layers in screen portion 42. Desirably, the vibration rate for leveling a batch of pulverulent constituents in making cellular glass, for example, should be between about 1,000 rpm and about 2300 rpm. More preferably, the vibration rate should be between about 1,100 rpm and 1,800 rpm. A vibration rate less than about 1,000 rpm tends to significantly promote batch hang-up in the pulverulent constituent batch in that the leveling action is not as rapid as when the vibration rate is within the above mentioned desired range, and a rate of vibration over about 2300 rpm tends to "whip-up" the pulverulent constituent batch, which may promote the formation of voids or pockets in the resultant vitreous cellular material.

Spring 68 of each spring assembly 62, spring 68 desirably being a compression spring, should be fabricated of a suitable material, such as stainless steel, and be of sufficient strength so as to assist with the suspension of support member 12 having motor 60 and screen structure 38 engaged therewith. Further, each spring 68 should be compatible with motor 60 and the complete suspended apparatus so as to together provide a means for vibrating screen structure 38 horizontally in a circular orbital motion. An example of a suitable spring is found in Sweco Model S-30S00200.

The motor and spring assemblies arrangement illustrated in FIGS. 2 and 6 is an example of a suitable means for vibrating screen structure 38 horizontally in a circular orbital motion. Other suitable conventional arrangements and adaptations are possible. For example, various assemblies employing a suitable jack shaft and a suitable ordinary motor can alternatively be used in the apparatus of the present invention.

Frame plate member 78 shown in FIGS. 2 and 6 is part of a means for impressing screen structure 38 down into and through at least a portion of a batch of pulverulent constituents, plate member 78 being in communication with support member 12 through attachment to spring assemblies 62, as previously discussed herein. Plate member 78 is in engagement with a suitable conventional means (not shown) for generally vertically reciprocating frame plate member 78 to provide for impressing screen structure 38 down into and through at least a portion of a batch of pulverulent constituents or removing screen structure 38 from a batch of pulverulent constituents. Examples of such conventional means are a hydraulic or a pneumatic piston arrangement or a worm gear arrangement suitably in engagement with plate member 78 as by being bolted or welded thereto. Such conventional means having plate member 78 in engagement therewith is appropriately supported in any suitable known manner such as from a suitable frame structure or member (not shown) as is known to those skilled in the art.

A typical operation of the present invention can be briefly described as follows. The apparatus 10 of the present invention is positioned above a batch of pulverulent constituents, such as a batch of pulverulent constituents in a mold pan. Upon activation of a suitable conventional timing mechanism for controlling the batch leveling cycle and the residence time of the apparatus of the present invention in the batch, a piston arrangement or other suitable means for providing generally vertical displacement of apparatus 10, as previously described, is activated and apparatus 10 is caused to move in a downward direction to the batch of pulverulent constituents. Motor 60 is desirably concurrently activated at the time the means for providing generally vertical displacement is activated; and motor 60 and spring assemblies 62 impart vibration to screen structure 38 horizontally in a circular orbital motion. Screen structure 38 is impressed down into and through at least a portion of the batch of pulverulent constituents while simultaneously vibrating screen structure 38 horizontally in a circular orbital motion. Screen structure 38 is impressed through generally at least about ½ of the depth of the pulverulent constituent batch and, preferably, through substantially all of the batch. Screen structure 38 being so impressed and so vibrated is maintained in contact with the batch of pulverulent constituents desirably for a residence time up to about 10 seconds, with a residence time of from about 1 to about 5 seconds being most preferred. However, various factors can affect the residence time, such as the depth of the batch, and the batch composition, and the particulate characteristics of the pulverulent batch material, such particulate characteristics being, for example, size, shape, size distribution, angularity, flowability, etc. The vibratory action of screen structure 38 promotes the substantially uniform leveling, distributing and compacting of the portion of the batch so vibrated by impressing screen structure 38 therethrough. The vibratory action of screen structure 38 also promotes the removal of air from within the batch of constituents. Upon completion of the desired residence time in the batch, screen structure 38 is removed from the batch by reversing the direction of the action of the previously mentioned piston arrangement or other suitable means, screen structure 38 still being vibrated during removal from the batch. The batch is leveled in a manner such that the profile of the top surface of the leveled batch has a generally flat appearance. The pulverulent batch of constituents is now ready to be heated to sintering and cellulation temperatures to form the resultant vitreous cellular material.

In cellular glass buns which were formed in mold pans, it was found that cellular glass buns formed from a pulverulent constituent batch vibratory leveled to less than half the batch depth according to the present invention were about 1 to about 5 percent (or about 0.5 pcf) lower in density than companion buns formed from a non-vibrated batch, the lower density resulting from the compaction of the batch promoted by the vibratory leveling action of the present invention. The batch leveling according to the present invention also tended to promote an improved sintering rate and a more uniform cell and surface geometry in the cellular glass buns resulting from the substantially uniform leveling and distributing of the pulverulent constituents within the batch.

While the invention has been described with respect to the cellulation of a pulverulent batch of constituents in relation to a suitable mold, the use and application of the present invention should not be considered as being limited thereto. The method and apparatus of the present invention is also applicable to a moving bed of a continuous process, such as when a batch of pulverulent constituents is placed on a continuous conveyor. Further, while the invention for exemplary purposes has been described in regard to cellular glass, it is to be understood that it is applicable in making other vitreous cellular materials, such as suitable cellular siliceous materials formed from a pulverulent constituent batch, or in making other suitable pulverulent materials.

According to the provisions of the Patent Statutes, we have explained the principle, preferred construction and mode of operation of our invention and have illustrated and described what we now consider to represent its best embodiments. However, it should be understood that, within the scope of the appended claims, the invention may be practiced otherwise that as specifically illustrated and described.

We claim:

1. A method for leveling a batch of pulverulent constituents in a process for making a vitreous cellular material comprising the steps of,
   impressing a screen structure having at least one substantially flat screen layer down into and through at least a portion of said batch of pulverulent constituents, and
   vibrating said screen structure in a circular orbital motion in a substantially horizontal plane while impressing said screen structure down into and through at least a portion of said batch of pulverulent constituents to promote substantially uniform compaction and distribution of said constituents within said batch.

2. The method as set forth in claim 1 further comprising,
   suppressing vertical vibration of said screen structure.

3. The method as set forth in claim 1 wherein,
   said impressing and said vibrating of said screen structure occurs from about 1 second to about 10 seconds.

4. The method as set forth in claim 1 wherein,
   the vibration amplitude is at least about equal to the screen mesh size in said screen structure.

5. The method as set forth in claim 1 wherein,
   the vibration rate is from about 1,000 rpm to about 2,300 rpm.

6. The method as set forth in claim 1 wherein,
   the vibration amplitude is at least about equal to the screen mesh size in the screen structure, and
   the vibration rate is from about 1,000 rpm to about 2,300 rpm.

7. The method as set forth in claim 6 wherein,
   the vibration rate is from about 1,100 rpm to about 1,800 rpm.

8. A method for leveling a batch of pulverulent constituents in a process for making a shaped vitreous cellular material comprising the steps of,
   impressing a screen structure having two substantially flat screen layers, down into and through at least a portion of a batch of pulverulent constituents deposited on a shaping means surface, said screen layers being substantially uniformly spaced from each other, and
   vibrating said screen structure in a circular orbital motion in a substantially horizontal plane while impressing said screen structure down into and through at least a portion of said batch of pulverulent constituents to promote substantially uniform compaction and distribution of said constituents within said batch, the vibration amplitude being at least about equal to the screen mesh size and the vibration rate being from about 1,000 rpm to about 2,300 rpm.

9. The method as set forth in claim 8 wherein,
   the vibration rate is from about1,100 rpm to about 1,800 rpm.

10. The method as set forth in claim 8 further comprising,
    suppressing vertical vibration of said screen structure.

* * * * *